(12) United States Patent
Lin

(10) Patent No.: US 11,372,477 B2
(45) Date of Patent: Jun. 28, 2022

(54) EYE TRACKING METHOD, HEAD-MOUNTED DISPLAY, AND COMPUTER READABLE STORAGE MEDIUM

(71) Applicant: HTC Corporation, Taoyuan (TW)

(72) Inventor: Yung-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/941,535

(22) Filed: Jul. 29, 2020

(65) Prior Publication Data

US 2021/0034149 A1 Feb. 4, 2021

Related U.S. Application Data

(60) Provisional application No. 62/879,639, filed on Jul. 29, 2019.

(51) Int. Cl.

| G06F 3/13 | (2006.01) |
| H04N 5/247 | (2006.01) |
| G06T 7/292 | (2017.01) |
| G06F 3/01 | (2006.01) |
| G06T 7/73 | (2017.01) |
| G06T 7/246 | (2017.01) |

(52) U.S. Cl.
CPC .............. *G06F 3/013* (2013.01); *G06T 7/251* (2017.01); *G06T 7/292* (2017.01); *G06T 7/75* (2017.01); *H04N 5/247* (2013.01); *G06T 2207/30201* (2013.01)

(58) Field of Classification Search
USPC ........................................................ 348/78
See application file for complete search history.

(56) References Cited

U.S. PATENT DOCUMENTS 8,824,779 B1 * 9/2014 Smyth ................. G06T 7/593
382/154
2018/0157045 A1 * 6/2018 Davami ............. H04N 5/23267

FOREIGN PATENT DOCUMENTS

| CN | 108475109 | 8/2018 |
| CN | 108476311 | 8/2018 |
| CN | 108960937 | 12/2018 |
| TW | 201737143 | 10/2017 |

OTHER PUBLICATIONS

"Office Action of Taiwan Counterpart Application", dated Feb. 25, 2021, p. 1-p. 15.

* cited by examiner

*Primary Examiner* — Mikhail Itskovich
(74) *Attorney, Agent, or Firm* — JCIPRNET

(57) ABSTRACT

The disclosure provides an eye tracking method, an head-mounted display (HMD), and a computer readable storage medium. The method includes: capturing, by the first camera, a first eye image of a first eye of a wearer of the HMD; capturing, by the second camera, a second eye image of the first eye of the wearer; constructing a first eye model of the first eye based on the first eye image and the second eye image; capturing, by the first camera, a first specific eye image of the first eye of the wearer; obtaining a plurality of first specific eye landmarks in the first specific eye image; identifying a first eye pose of the first eye of the wearer based on the first eye model and the first specific eye landmarks.

14 Claims, 3 Drawing Sheets

EYE TRACKING METHOD, HEAD-MOUNTED DISPLAY, AND COMPUTER READABLE STORAGE MEDIUM

CROSS-REFERENCE TO RELATED APPLICATION

This application claims the priority benefit of U.S. provisional application Ser. No. 62/879,639, filed on Jul. 29, 2019. The entirety of the above-mentioned patent application is hereby incorporated by reference herein and made a part of this specification.

BACKGROUND OF THE INVENTION

1. Field of the Invention

The present invention generally relates to a tracking mechanism, in particular, to an eye tracking method, a head-mounted display (HMD), and a computer readable storage medium.

2. Description of Related Art

Tracking eye movement is helpful in many situations such as HMDs or in technologies requiring hands-free control. However, most of the conventional eye tracking technologies need to be implemented by using a depth camera for retrieving depth information, which increases the cost of implementation.

SUMMARY OF THE INVENTION

Accordingly, the present invention is directed to an eye tracking method, a head-mounted display (HMD), and a computer readable storage medium, which may be used for solving the above technical problems.

In one embodiment, the disclosure provides an eye tracking method, adapted to a head-mounted display (HMD) with a first camera and a second camera, including: capturing, by the first camera, a first eye image of a first eye of a wearer of the HMD; capturing, by the second camera, a second eye image of the first eye of the wearer; constructing a first eye model of the first eye based on the first eye image and the second eye image; capturing, by the first camera, a first specific eye image of the first eye of the wearer; obtaining a plurality of first specific eye landmarks in the first specific eye image; identifying a first eye pose of the first eye of the wearer based on the first eye model and the first specific eye landmarks.

In another embodiment, the disclosure provides an eye tracking method, adapted to a head-mounted display (HMD) with a first camera, a second camera, and a third camera, including: capturing, by the first camera, a first eye image of a first eye of a wearer of the HMD; capturing, by the second camera, a second eye image of the first eye of the wearer, wherein the first camera and the second camera are front cameras of the HMD, and the first eye image and the second eye image are captured before the wearer wears the HMD; constructing a first eye model of the first eye based on the first eye image and the second eye image; capturing, by the third camera, a first specific eye image of the first eye of the wearer, wherein the third camera is an eye camera inside of the HMD for capturing eye images of the first eye, and the first specific eye image is captured after the wearer wears the HMD; obtaining a plurality of first specific eye landmarks in the first specific eye image; identifying a first eye pose of the first eye of the wearer based on the first eye model and the first specific eye landmarks.

In another embodiment, the disclosure provides a head-mounted display (HMD) including a first camera, a second camera, a storage circuit, and a processor. The storage circuit stores a plurality of modules. The processor is coupled to the first camera, the second camera, and the storage circuit, and accesses the modules to perform following steps: controlling the first camera to capture a first eye image of a first eye of a wearer of the HMD; controlling the second camera to capture a second eye image of the first eye of the wearer; constructing a first eye model of the first eye based on the first eye image and the second eye image; controlling the first camera to capture a first specific eye image of the first eye of the wearer; obtaining a plurality of first specific eye landmarks in the first specific eye image; identifying a first eye pose of the first eye of the wearer based on the first eye model and the first specific eye landmarks.

In another embodiment, the disclosure provides a non-transitory computer readable storage medium, recording an executable computer program to be loaded by a head-mounted display (HMD) including a first camera and a second camera to execute steps of: capturing, by the first camera, a first eye image of a first eye of a wearer of the HMD; capturing, by the second camera, a second eye image of the first eye of the wearer; constructing a first eye model of the first eye based on the first eye image and the second eye image; capturing, by the first camera, a first specific eye image of the first eye of the wearer; obtaining a plurality of first specific eye landmarks in the first specific eye image; identifying a first eye pose of the first eye of the wearer based on the first eye model and the first specific eye landmarks.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
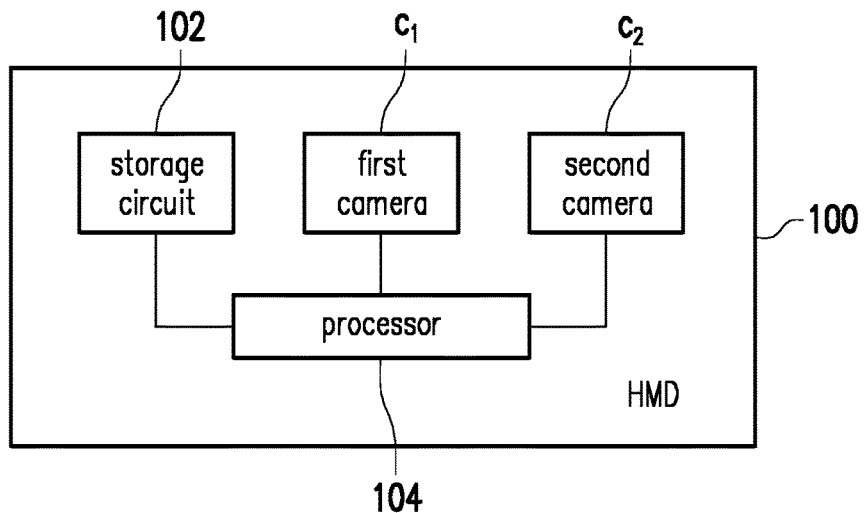
FIG. 1 shows a schematic diagram illustrating an HMD according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram illustrating an HMD according to an embodiment of the disclosure. In FIG. 1, the HMD 100 includes a first camera $c_1$, a second camera $c_2$, a storage circuit 102, and a processor 104.

The storage circuit 102 is one or a combination of a stationary or mobile random access memory (RAM), read-only memory (ROM), flash memory, hard disk, or any other similar device, and which records a plurality of modules that can be executed by the processor 104.

In one embodiment, the first camera $c_1$ and the second camera $c_2$ may be the eye cameras located inside of the HMD 100 for capturing eye images of the wearer of the HMD. For ease of the following discussions, the first camera $c_1$ may be assumed to be designed for capturing images of a first eye (e.g., the right eye) of the wearer when the HMD 100 is worn by the wearer, and the second camera $c_2$ may be assumed to be designed for capturing images of a second eye (e.g., the left eye) of the wearer when the HMD 100 is worn by the wearer, but the disclosure is not limited thereto.

In various embodiments, the first camera $c_1$ and the second camera $c_2$ could be any cameras having charge coupled device (CCD) lens, complementary metal oxide semiconductor transistors (CMOS) lens, or the like.

The processor 104 may be coupled with the storage circuit 102, the first camera $c_1$ and the second camera $c_2$, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

In the embodiments of the disclosure, the processor 104 may access the modules stored in the storage circuit 102 to implement the eye tracking method provided in the disclosure, which would be further discussed in the following.

Figure 2:
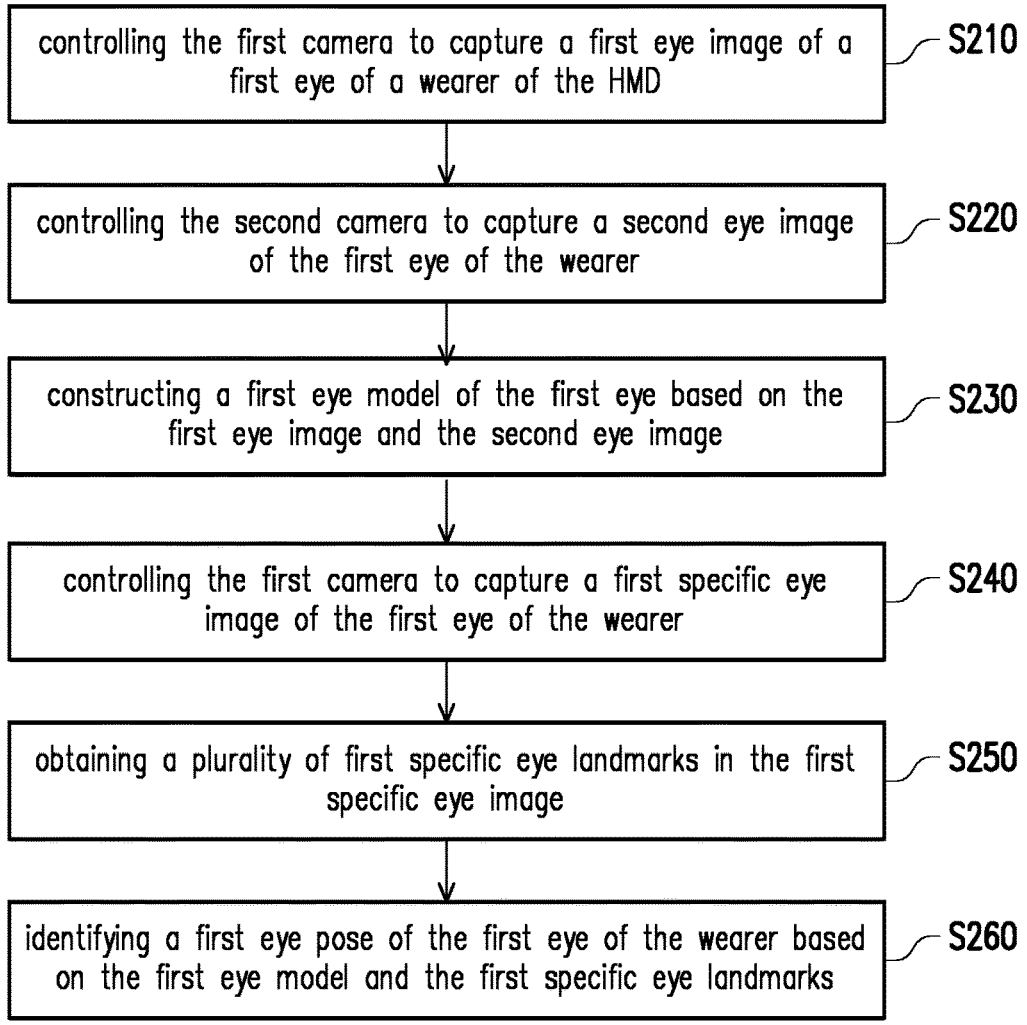
FIG. 2 shows a flow chart of the eye tracking method according to an embodiment of the disclosure.
Figure 3:
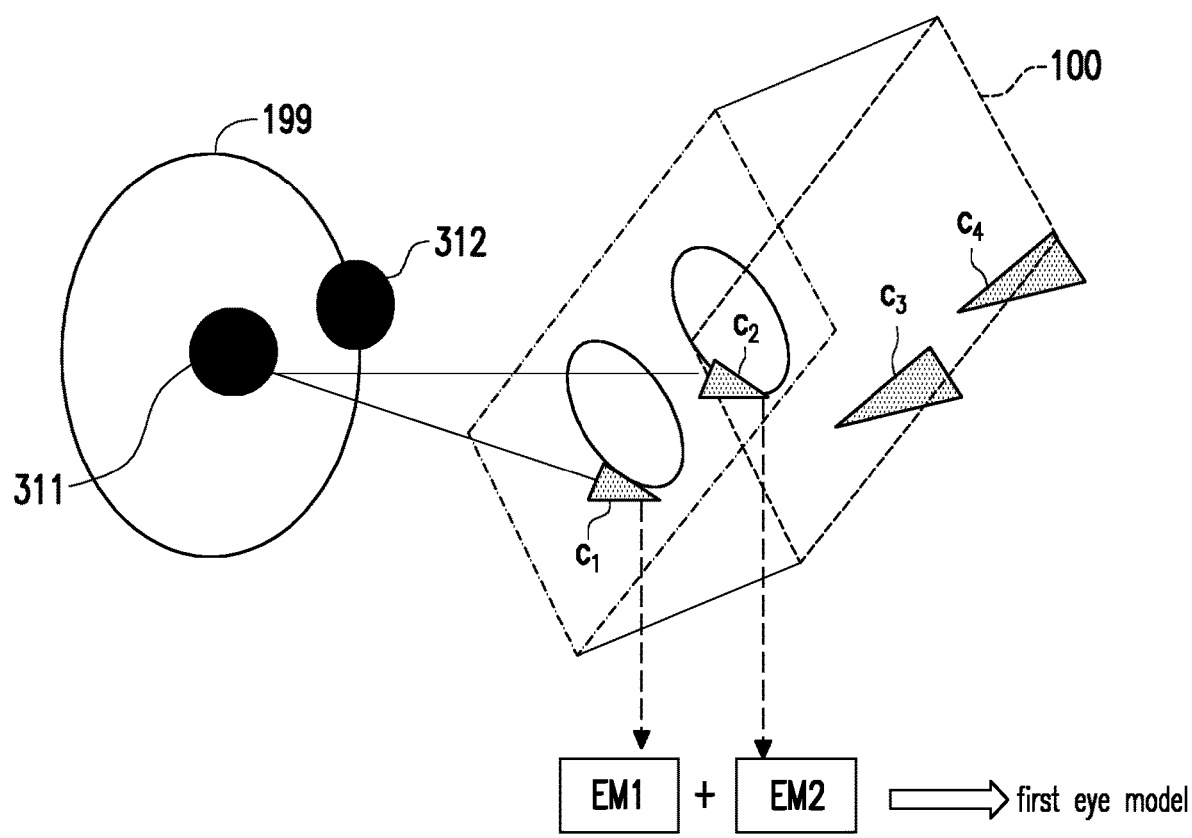
FIG. 3 is a schematic diagram illustrating an eye tracking scenario according to a first embodiment of the disclosure.

See FIG. 2, which shows a flow chart of the eye tracking method according to an embodiment of the disclosure. The method of this embodiment may be executed by the HMD 100 in FIG. 1, and the details of each step in FIG. 2 will be described below with the components shown in FIG. 1. In addition, for better understanding the concept of the disclosure, FIG. 3 would be used as an example, wherein FIG. 3 is a schematic diagram illustrating an eye tracking scenario according to a first embodiment of the disclosure.

In the following discussions, the mechanism for performing eye tracking to the first eye would be explained, and the mechanism for performing eye tracking to the second eye may be understood based on the same teachings.

Specifically, in step S210, the processor 104 may control the first camera $c_1$ to capture a first eye image EM1 of a first eye 311 of a wearer 199 of the HMD 100. In step S220, the processor 104 may control the second camera $c_2$ to capture a second eye image EM2 of the first eye 311 of the wearer 199. That is, both of the first camera $c_1$ and the second camera $c_2$ are used to capture eye images of the same eye (i.e., the first eye 311). For implementing the steps S210 and S220, the first eye image EM1 and the second eye image EM2 may be captured before the wearer 199 wears the HMD 100. For example, the wearer 199 may hold the HMD 100 in front of his/her face for the first camera $c_1$ and the second camera $c_2$ to respectively capture the first eye image EM1 and the second eye image EM2 of the first eye 311, but the disclosure is not limited thereto.

In some other embodiments, the first eye image EM1 and the second eye image EM2 may be captured with cameras $c_3$ and $c_4$, which may be the front cameras of the HMD 100, and the details would be discussed with a second embodiment of the disclosure.

After retrieving the first eye image EM1 and the second eye image EM2, the processor 104 may perform step S230 to construct a first eye model of the first eye 311 based on the first eye image EM1 and the second eye image EM2.

In one embodiment, the processor 104 may input the first eye image EM1 to a 2D eye landmark detection model, wherein the 2D eye landmark detection model may output a first tensor in response to the first eye image EM1, and the first tensor may indicate a 2D position of each of a plurality of first landmarks in the first eye image EM1. In one embodiment, the 2D eye landmark detection model may be a convolutional neural network (CNN) pre-trained for obtaining eye landmarks in the received image (e.g., the first eye image EM1).

In one embodiment, the first tensor may be a matrix with a dimension of W×H×C, wherein W may be the width of the first eye image EM1 and H may be the height of the first eye image EM1. In one embodiment, C may be a predetermined number of the first landmarks in the first eye image EM1, which may be also regarded as the number of channels in the first eye image EM1. That is, the first tensor may be regarded as including C channels, wherein the channels one-to-one correspond to the first landmarks, and each channel is a W×H matrix.

In one embodiment, each channel indicates the probability distribution of the corresponding first landmark in the first eye image EM1. For example, for an i-th first landmark, the corresponding channel would have a certain matrix element having maximum value, wherein the position of this matrix element in the channel indicates the position of the i-th first landmark in the first eye image EM1.

Similarly, the processor 104 may input the second eye image EM2 to the 2D eye landmark detection model, wherein the 2D eye landmark detection model outputs a second tensor in response to the second eye image EM2, the second tensor indicates a 2D position of each of a plurality of second landmarks in the second eye image EM2. The details of the second tensor may be referred to the discussions of the first tensor, which would not be repeated herein.

In one embodiment, the second landmarks may one-to-one correspond to the first landmarks. Specifically, the i-th second landmark and the i-th first landmark correspond to the same landmark in the first eye 311. Therefore, the i-th channel in the first tensor and the i-th channel in the second tensor correspond to the same landmark in the first eye 311.

In this case, the processor 104 may obtaining a 3D position of each of a plurality of first eye landmarks of the first eye 311 of the wearer 199 based on the first landmarks, the second landmarks, and a plurality of camera geometry parameters of the first camera $c_1$ and the second camera $c_2$, and accordingly constructing the first eye model of the first eye 311.

In one embodiment, the camera geometry parameters of the first camera $c_1$ and the second camera $c_2$ may include various external parameters and internal parameters of the first camera $c_1$ and the second camera $c_2$, but the disclosure is not limited thereto.

With the camera geometry parameters, the 3D position of each of a plurality of first eye landmarks of the first eye 311 may be obtained through the triangulation methods in multi-view geometry, and the details there of may be referred to "Richard Hartley and Andrew Zisserman (2003). Multiple View Geometry in computer vision. Cambridge University Press. ISBN 978-0-521-54051-3", which would not be repeated herein.

Figure 4:
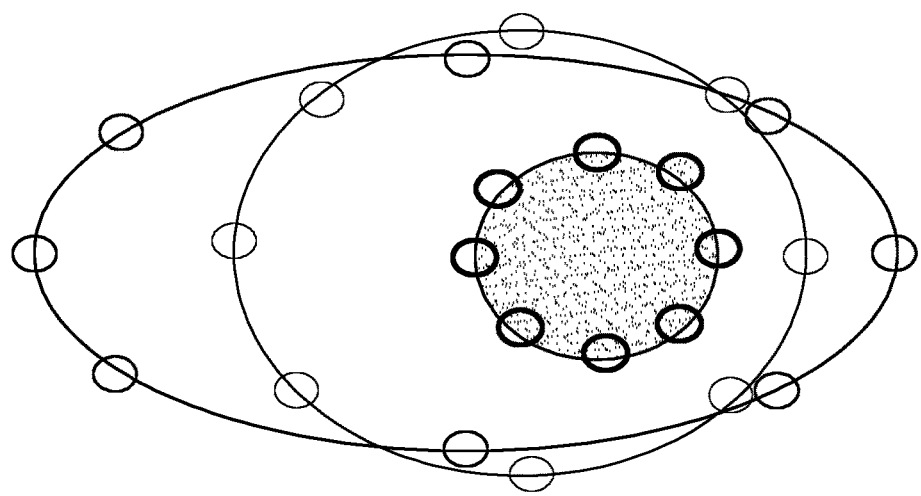
FIG. 4 shows the first eye landmarks of the first eye according to an embodiment of the disclosure.

See FIG. 4, which shows the first eye landmarks of the first eye according to an embodiment of the disclosure. In FIG. 4, the first eye 311 may be labelled with a predetermined number (i.e., C) of first eye landmarks (illustrated as hollowed circles), and the 3D position of each first eye landmark may be used constructing the first eye model of the first eye 311. In one embodiment, the first eye model may include the physical dimension of the iris, pupil and eyelid of the first eye 311, but the disclosure is not limited thereto.

After obtaining the first eye model of the first eye 311, the processor 104 may perform step S240 to control the first camera $c_1$ to capture a first specific eye image of the first eye 311 of the wearer 199. In one embodiment, the first specific eye image may be captured after the wearer 199 wears the HMD 100.

Figure 5:
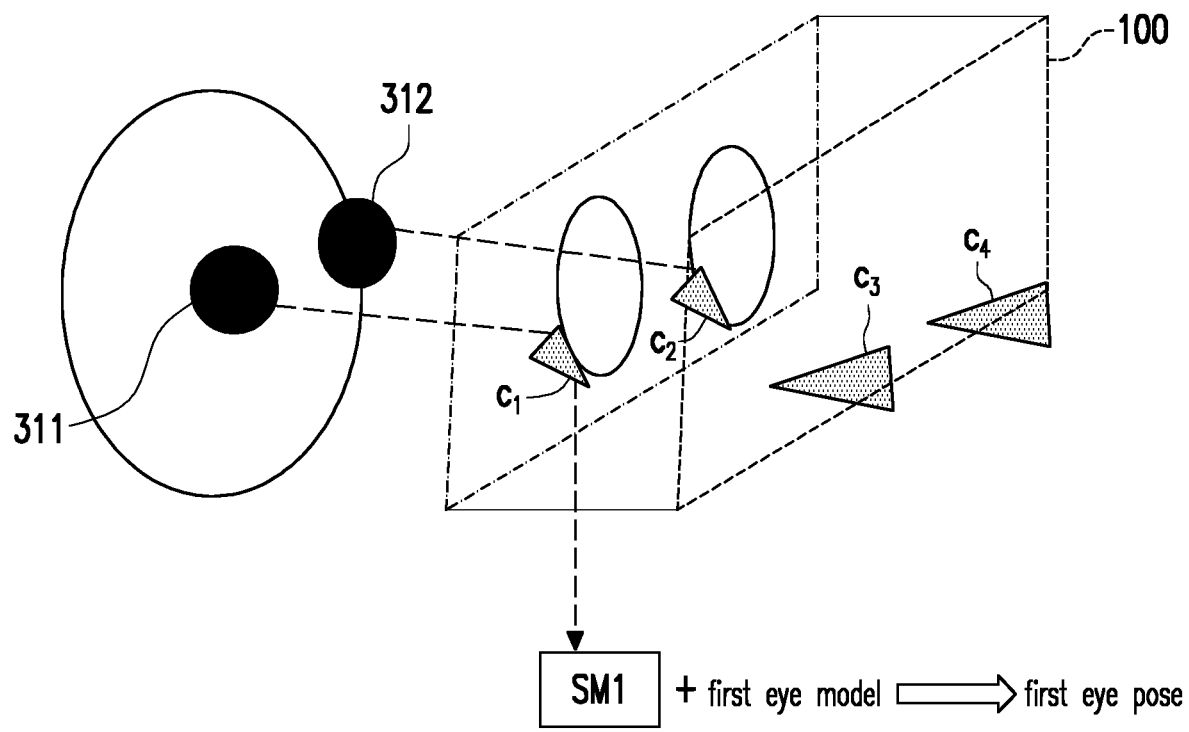
FIG. 5 shows a schematic diagram of capturing a first specific eye image according to an embodiment of the disclosure.

See FIG. 5, which shows a schematic diagram of capturing a first specific eye image according to an embodiment of the disclosure. In FIG. 4, it is assumed that the wearer 199 has worn the HMD 100, and hence the first camera $c_1$ may be used to capture a first specific eye image SM1 of the first eye 311 as the first camera $c_1$ was designed for.

Next, in step S250, the processor 104 may obtain a plurality of first specific eye landmarks (which may be 2D eye landmarks) in the first specific eye image SM1. In one embodiment, the processor 104 may input the first specific eye image SM1 to the 2D eye landmark detection model, wherein the 2D eye landmark detection model may output a first specific tensor in response to the first specific eye image SM1, and the first specific tensor may indicate a 2D position of each of the first specific eye landmarks in the first specific eye image SM1. The details of the first specific tensor may be referred to the discussions of the first tensor and the second tensor, which would not be repeated herein.

Afterwards, in step S260, the processor 104 may identify a first eye pose of the first eye 311 of the wearer 199 based on the first eye model and the first specific eye landmarks. In one embodiment, the processor 104 may retrieve a 3D position of each first specific eye landmarks by using a Project N points (PNP) algorithm based on the first eye model and the first specific eye landmarks. Details of the PNP algorithm may be referred to related technical documents, which would not be repeated herein.

Next, the processor 104 may identify the first eye pose based on the 3D position of each first specific eye landmarks. Specifically, the processor 104 may use the PNP algorithm to estimate position and orientation of the first specific eye landmarks including pupil, iris, eyelid. In various embodiments, the pupil size will vary in real time while the iris and eyelid remained unchanged, so the distance is estimated from the unchanged size feature then the pupil size can be estimated from the ellipse captured in the first specific eye image SM1, but the disclosure is not limited thereto.

In brief, the method provided in the disclosure may be regarded as including two stages, wherein a first stage includes steps S210-S230, and a second stage includes steps S240-S260. In the first stage, the first eye model of the first eye 311 may be constructed based on the first eye image EM1 and the second eye image EM2 captured before the wearer 199 wears the HMD 100. In the second stage, the first eye pose of the first eye 311 may be identified based on the first eye model and the first specific eye landmarks found in the first specific eye image captured after the wearer 199 has worn the HMD 100. In this case, the first eye model of the first eye 311 may be constructed without any depth information, and hence there is no need to dispose any depth camera for providing depth information for performing eye tracking. Therefore, the disclosure has provided a novel way to perform eye tracking, and the cost of implementing eye tracking may be reduced.

In one embodiment, for performing eye tracking to the second eye 312 of the wearer 199, the processor 104 may be configured to: control the first camera $c_1$ to capture third eye image of the second eye 312 of the wearer 199 of the HMD 100; control the second camera $c_2$ to capture a fourth eye image of the second eye 312 of the wearer 199. Similar to the first eye image EM1 and the second eye image EM2, the third eye image and the fourth eye image may be captured before the wearer 199 wears the HMD 100. Next, the processor 104 may construct a second eye model of the second eye 312 based on the third eye image and the fourth eye image, and the details thereof may be referred to the teachings related to the first stage in previous embodiments, which would not be repeated herein.

Afterwards, the processor 104 may control the second camera $c_2$ to capture a second specific eye image of the second eye 312 of the wearer 199, wherein the second specific eye image may be captured after the wearer 199 wears the HMD 100. With the second specific eye image, the processor 104 may obtain a plurality of second specific eye landmarks in the second specific eye image and identify a second eye pose of the second eye 312 of the wearer 199 based on the second eye model and the second specific eye landmarks. The details of these steps may be referred to the teachings related to the second stage in previous embodiments, which would not be repeated herein.

In some embodiments, since the first eye image EM1 and the second eye image EM2 may be captured before the wearer 199 wears the HMD 100, the first eye image EM1 and the second eye image EM2 may be captured by the front cameras of the HMD 100 as mentioned in the above.

Figure 6:
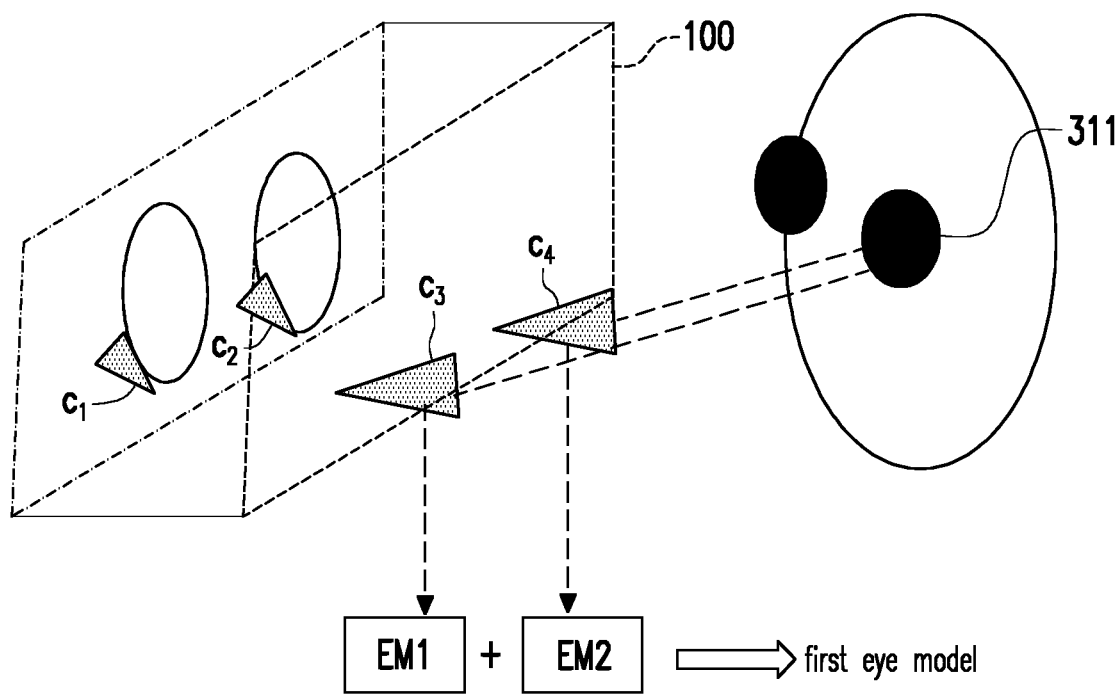
FIG. 6 is a schematic diagram illustrating an eye tracking scenario according to the second embodiment of the disclosure.

See FIG. 6, which is a schematic diagram illustrating an eye tracking scenario according to the second embodiment of the disclosure. Specifically, in the second embodiment, the processor 104 may be configured to: control the camera $c_3$ to capture the first eye image EM1 of the first eye 311 of the wearer 199 of the HMD 100 and control the camera $c_4$ to capture the second eye image EM2 of the first eye 311 of the wearer 199. Similar to the first embodiment, the first eye image EM1 and the second eye image EM2 may be captured before the wearer 199 wears the HMD 100. For example, the wearer 199 may hold the HMD 100 in front of his/her face for the camera $c_3$ and the camera $c_4$ to respectively capture the first eye image EM1 and the second eye image EM2 of the first eye 311, but the disclosure is not limited thereto. With the first eye image EM1 and the second eye image EM2, the processor 104 may construct the first eye model of the first eye 311 based on the first eye image EM1 and the second eye image EM2, and the details thereof may be referred to the teachings related to the first stage in the first embodiment, which would not be repeated herein.

In the second embodiment, after the wearer 199 wears the HMD 100, the processor 104 may control the first camera $c_1$ to capture the first specific eye image SM1 of the first eye 311 of the wearer as shown in FIG. 5. Next, the processor 104 may be configured to: obtain the first specific eye landmarks in the first specific eye image SM1 and identify the first eye pose of the first eye 311 of the wearer 199 based on the first eye model and the first specific eye landmarks.

The related details may be referred to the teachings of the second stage in the first embodiment, which would not be repeated herein.

In addition, the second eye pose of the second eye 312 may be identified based on the teachings in the above, which would not be repeated herein.

The disclosure further provides a computer readable storage medium for executing the eye tracking method. The computer readable storage medium is composed of a plurality of program instructions (for example, a setting program instruction and a deployment program instruction) embodied therein. These program instructions can be loaded into the HMD 100 and executed by the same to execute the eye tracking method and the functions of the HMD 100 described above.

In summary, in the first stage of the provided method, the eye model of the considered eye may be constructed based on the eye images captured before the wearer wears the HMD. In the second stage of the provided method, the eye pose of the considered eye may be identified based on the eye model and the specific eye landmarks found in the specific eye image captured after the wearer has worn the HMD. With the two stages, the eye model of the considered eye may be constructed without any depth information, and hence there is no need to dispose any depth camera for providing depth information for performing eye tracking. Therefore, the disclosure has provided a novel way to perform eye tracking, and the cost of implementing eye tracking may be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An eye tracking method, adapted to a head-mounted display (HMD) with a first camera and a second camera, comprising:
    capturing, by the first camera, a first eye image of a first eye of a wearer of the HMD;
    capturing, by the second camera, a second eye image of the first eye of the wearer;
    constructing a first eye model of the first eye based on the first eye image and the second eye image;
    capturing, by the first camera, a first specific eye image of the first eye of the wearer;
    obtaining a plurality of first specific eye landmarks in the first specific eye image; and
    identifying a first eye pose of the first eye of the wearer based on the first eye model and the first specific eye landmarks,
    wherein the step of constructing the first eye model of the first eye based on the first eye image and the second eye image comprising:
        inputting the first eye image to a 2D eye landmark detection model, wherein the 2D eye landmark detection model outputs a first tensor in response to the first eye image, and the first tensor indicates a 2D position of each of a plurality of first landmarks in the first eye image;
        inputting the second eye image to the 2D eye landmark detection model, wherein the 2D eye landmark detection model outputs a second tensor in response to the second eye image, the second tensor indicates a 2D position of each of a plurality of second landmarks in the second eye image, wherein the second landmarks one-to-one corresponds to the first landmarks; and
        obtaining a 3D position of each of a plurality of first eye landmarks of the first eye of the wearer based on the first landmarks, the second landmarks, and a plurality of camera geometry parameters of the first camera and the second camera, and accordingly constructing the first eye model of the first eye,
    wherein the first eye image and the second eye image are captured before the wearer wears the HMD,
    wherein the first specific eye image is captured after the wearer wears the HMD.

2. The method according to claim 1, wherein the step of obtaining the first specific eye landmarks in the first specific eye image comprising:
    inputting the first specific eye image to the 2D eye landmark detection model, wherein the 2D eye landmark detection model outputs a first specific tensor in response to the first specific eye image, and the first specific tensor indicates a 2D position of each of the first specific eye landmarks in the first specific eye image.

3. The method according to claim 1, wherein the first specific eye landmarks in the first specific eye image are 2D eye landmarks.

4. The method according to claim 1, wherein the step of identifying the first eye pose of the first eye of the wearer based on the first eye model and the first specific eye landmarks comprising:
    retrieving a 3D position of each of the first specific eye landmarks by using a Project N points (PNP) algorithm based on the first eye model and the first specific eye landmarks; and
    identifying the first eye pose based on the 3D position of each of the first specific eye landmarks.

5. The method according to claim 1, further comprising:
    capturing, by the first camera, a third eye image of a second eye of the wearer of the HMD;
    capturing, by the second camera, a fourth eye image of the second eye of the wearer, wherein the third eye image and the fourth eye image are captured before the wearer wears the HMD;
    constructing a second eye model of the second eye based on the third eye image and the fourth eye image;
    capturing, by the second camera, a second specific eye image of the second eye of the wearer, wherein the second specific eye image is captured after the wearer wears the HMD;
    obtaining a plurality of second specific eye landmarks in the second specific eye image; and
    identifying a second eye pose of the second eye of the wearer based on the second eye model and the second specific eye landmarks.

6. The method according to claim 1, wherein the first camera and the second camera are eye cameras inside of the HMD, the first camera is used for capturing eye images of the first eye, and the second camera is used for capturing eye images of the second eye.

7. An eye tracking method, adapted to a head-mounted display (HMD) with a first camera, a second camera, and a third camera, comprising:
    capturing, by the first camera, a first eye image of a first eye of a wearer of the HMD;
    capturing, by the second camera, a second eye image of the first eye of the wearer, wherein the first camera and the second camera are front cameras of the HMD, and the first eye image and the second eye image are captured before the wearer wears the HMD;

constructing a first eye model of the first eye based on the first eye image and the second eye image;

capturing, by the third camera, a first specific eye image of the first eye of the wearer, wherein the third camera is an eye camera inside of the HMD for capturing eye images of the first eye, and the first specific eye image is captured after the wearer wears the HMD;

obtaining a plurality of first specific eye landmarks in the first specific eye image; and identifying a first eye pose of the first eye of the wearer based on the first eye model and the first specific eye landmarks, wherein the step of constructing the first eye model of the first eye based on the first eye image and the second eye image comprising:

inputting the first eye image to a 2D eye landmark detection model, wherein the 2D eye landmark detection model outputs a first tensor in response to the first eye image, and the first tensor indicates a 2D position of each of a plurality of first landmarks in the first eye image;

inputting the second eye image to the 2D eye landmark detection model, wherein the 2D eye landmark detection model outputs a second tensor in response to the second eye image, the second tensor indicates a 2D position of each of a plurality of second landmarks in the second eye image, wherein the second landmarks one-to-one corresponds to the first landmarks; and obtaining a 3D position of each of a plurality of first eye landmarks of the first eye of the wearer based on the first landmarks, the second landmarks, and a plurality of camera geometry parameters of the first camera and the second camera, and accordingly constructing the first eye model of the first eye, wherein the first eye image and the second eye image are captured before the wearer wears the HMD, wherein the first specific eye image is captured after the wearer wears the HMD.

8. A head-mounted display (HMD), comprising:

a first camera;

a second camera;

a storage circuit, storing a plurality of modules; and a processor, coupled to the first camera, the second camera, and the storage circuit, and accessing the modules to perform following steps:

controlling the first camera to capture a first eye image of a first eye of a wearer of the HMD;

controlling the second camera to capture a second eye image of the first eye of the wearer;

constructing a first eye model of the first eye based on the first eye image and the second eye image;

controlling the first camera to capture a first specific eye image of the first eye of the wearer;

obtaining a plurality of first specific eye landmarks in the first specific eye image; and identifying a first eye pose of the first eye of the wearer based on the first eye model and the first specific eye landmarks, wherein the processor is configured to:

input the first eye image to a 2D eye landmark detection model, wherein the 2D eye landmark detection model outputs a first tensor in response to the first eye image, and the first tensor indicates a 2D position of each of a plurality of first landmarks in the first eye image;

input the second eye image to the 2D eye landmark detection model, wherein the 2D eye landmark detection model outputs a second tensor in response to the second eye image, the second tensor indicates a 2D position of each of a plurality of second landmarks in the second eye image, wherein the second landmarks one-to-one corresponds to the first landmarks; and obtaining a 3D position of each of a plurality of first eye landmarks of the first eye of the wearer based on the first landmarks, the second landmarks, and a plurality of camera geometry parameters of the first camera and the second camera, and accordingly constructing the first eye model of the first eye, wherein the first eye image and the second eye image are captured before the wearer wears the HMD, wherein the first specific eye image is captured after the wearer wears the HMD.

9. The HMD according to claim 8, wherein the processor is configured to:

input the first specific eye image to the 2D eye landmark detection model, wherein the 2D eye landmark detection model outputs a first specific tensor in response to the first specific eye image, and the first specific tensor indicates a 2D position of each of the first specific eye landmarks in the first specific eye image.

10. The HMD according to claim 8, wherein the first specific eye landmarks in the first specific eye image are 2D eye landmarks.

11. The HMD according to claim 8, wherein processor is configured to:

retrieve a 3D position of each first specific eye landmarks by using a Project N points (PNP) algorithm based on the first eye model and the first specific eye landmarks;

identify the first eye pose based on the 3D position of each first specific eye land marks.

12. The HMD according to claim 8, wherein the processor is further configured to:

controlling the first camera to capture third eye image of a second eye of the wearer of the HMD;

controlling the second camera to capture a fourth eye image of the second eye of the wearer, wherein the third eye image and the fourth eye image are captured before the wearer wears the HMD;

constructing a second eye model of the second eye based on the third eye image and the fourth eye image;

controlling the second camera to capture a second specific eye image of the second eye of the wearer, wherein the second specific eye image is captured after the wearer wears the HMD;

obtaining a plurality of second specific eye landmarks in the second specific eye image; and identifying a second eye pose of the second eye of the wearer based on the second eye model and the second specific eye landmarks.

13. The HMD according to claim 8, wherein the first camera and the second camera are eye cameras inside of the HMD, the first camera is used for capturing eye images of the first eye, and the second camera is used for capturing eye images of the second eye.

14. A non-transitory computer readable storage medium, recording an executable computer program to be loaded by a head-mounted display (HMD) comprising a first camera and a second camera to execute steps of:

capturing, by the first camera, a first eye image of a first eye of a wearer of the HMD;
capturing, by the second camera, a second eye image of the first eye of the wearer;
constructing a first eye model of the first eye based on the first eye image and the second eye image;
capturing, by the first camera, a first specific eye image of the first eye of the wearer;
obtaining a plurality of first specific eye landmarks in the first specific eye image; and
identifying a first eye pose of the first eye of the wearer based on the first eye model and the first specific eye landmarks,
wherein the step of constructing the first eye model of the first eye based on the first eye image and the second eye image comprising:
    inputting the first eye image to a 2D eye landmark detection model, wherein the 2D eye landmark detection model outputs a first tensor in response to the first eye image, and the first tensor indicates a 2D position of each of a plurality of first landmarks in the first eye image;
    inputting the second eye image to the 2D eye landmark detection model, wherein the 2D eye landmark detection model outputs a second tensor in response to the second eye image, the second tensor indicates a 2D position of each of a plurality of second landmarks in the second eye image, wherein the second landmarks one-to-one corresponds to the first landmarks; and
    obtaining a 3D position of each of a plurality of first eye landmarks of the first eye of the wearer based on the first landmarks, the second landmarks, and a plurality of camera geometry parameters of the first camera and the second camera, and accordingly constructing the first eye model of the first eye,
wherein the first eye image and the second eye image are captured before the wearer wears the HMD,
wherein the first specific eye image is captured after the wearer wears the HMD.

* * * * *